Nov. 7, 1961

KOJI SHO 3,007,365

COMBINED VARIABLE BRIGHT FRAME VIEWFINDER AND
RANGEFINDER FOR PHOTOGRAPHIC CAMERA

Filed Oct. 22, 1957

INVENTOR.
KOJI SHO
BY
ATTORNEY

Nov. 7, 1961  KOJI SHO  3,007,365
COMBINED VARIABLE BRIGHT FRAME VIEWFINDER AND
RANGEFINDER FOR PHOTOGRAPHIC CAMERA
Filed Oct. 22, 1957  2 Sheets-Sheet 2
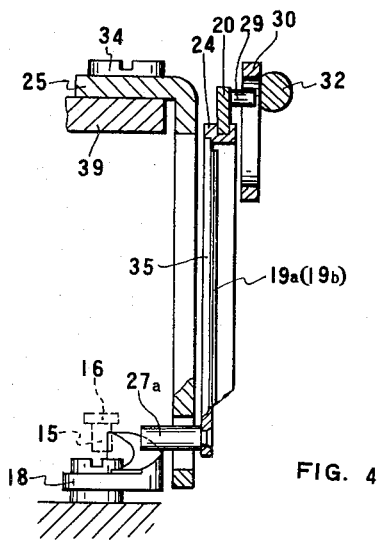
FIG. 4
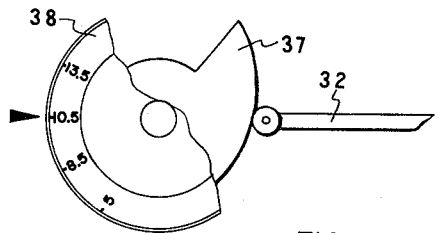
FIG. 5
FIG. 6
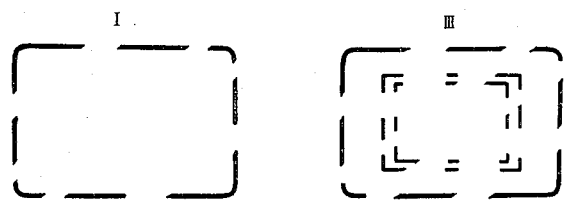
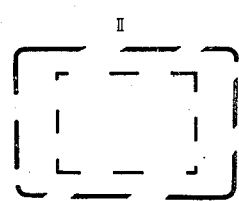
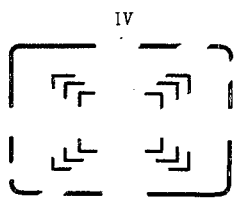
INVENTOR.
KOJI SHO
BY
ATTORNEY

United States Patent Office 3,007,365
Patented Nov. 7, 1961

3,007,365
COMBINED VARIABLE BRIGHT FRAME VIEW-FINDER AND RANGEFINDER FOR PHOTO-GRAPHIC CAMERA
Koji Sho, Tsurumiku, Yokohama, Kanagawa-ken, Japan, assignor to Nippon Kogahu K.K., Tokyo, Japan, a corporation of Japan
Filed Oct. 22, 1957, Ser. No. 691,766
3 Claims. (Cl. 88—1.5)

The present invention relates to a combined view and rangefinder for photographic cameras, and more particularly to a combined view and rangefinder with variable border lines of the picture area in accordance with a particular one of the plurality of interchangeable objectives then in the objective aperture.

It is preferable to form a bright image of a border of the picture area in the finder field of view selectively of the size required for each of the various interchangeable objectives used with the photographic camera. The need therefor has been critical and various devices and means have been designed to satisfy this requirement. However, the conventional devices are unavoidably subject to the disadvantage that their space requirements and structure restrict the otherwise available range of interchangeable objectives requiring picture areas of different sizes than those positionable in the field of the view finder.

It is an object of the present invention to provide a combined view and rangefinder with superimposed bright frames representing the borders of picture areas corresponding to various interchangeable objectives of different focal lengths, and comprising either the whole, or selected portions, of the field of view area of the combined finder with sharply defined uniform brilliancy.

It is another object of the present invention to provide a free interchange of the border lines of image fields absolutely free of restriction to the available range and kind of the border lines of conventional viewfinders.

It is a further object of the present invention to provide an efficient variable bright frame viewfinder of the so-called motif finder type.

The technical essence of the combined finder of the present invention is to produce a border line of the picture area selectively and simultaneously by means of a pair of like shaped covering masks facing each other and movable in accordance with the interchange of photographic objectives.

A clearer concept of the scope and purpose of the present invention may be obtained from the following description, taken in connection with the attached drawing which shows an illustrative embodiment thereof, and in which:

FIG. 4 is a side view of the mechanism shown in FIG. 2 with a portion broken away;

FIG. 5 illustrates, in simple form, the interaction between a dial rotatively adjustable in accordance with the focal lengths of photographic objectives, and the selecting mechanism for the border line of the picture area corresponding to the selected objective, and FIG. 6 illustrates the border indications for each of the plurality of picture areas in accordance with various focal lengths of the objectives of a miniature photographic camera, for example, using 35 mm. film, of which 6I represents the frame for a focal length of 50 mm., 6II that for a focal length of 85 mm., 6III for a focal length of 105 mm., and 6IV the frame for a focal length of 135 mm.

Figure 1:
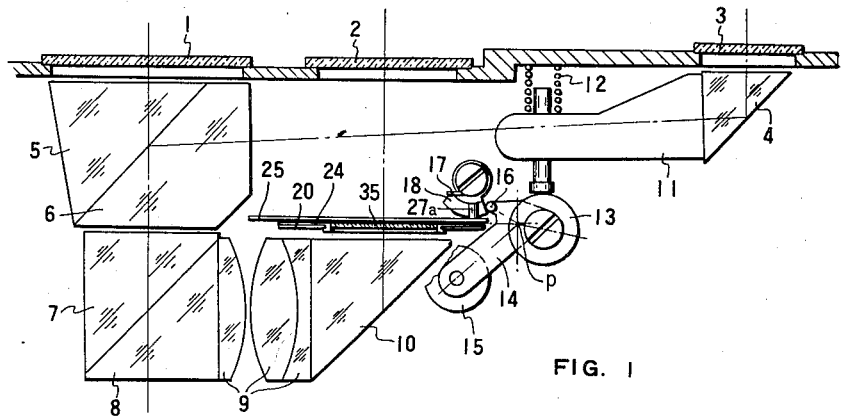
FIG. 1 is a plan view of a portion of the combined viewfinder and rangefinder embodying the invention.
Figure 3:
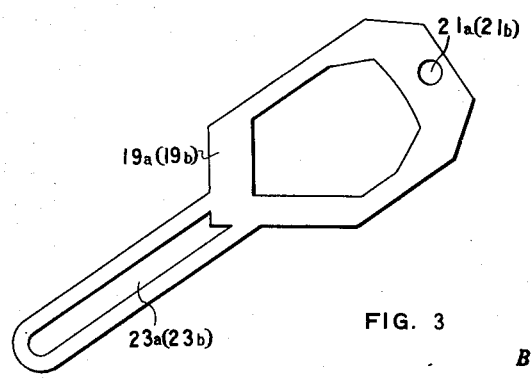
FIG. 3 is a front view of one covering mask of which a pair are used to cover and uncover the border line indications of the picture area.

Referring to FIG. 1, 1 and 3 are incident light apertures of a range finder of the known base-line system. 4 is a rotatable reflecting prism. 5 is a fixed prism. 6 is a half-reflecting layer. When the photographic objective is moved back and forth for focusing, roller 15 is deflected to urge prism 4 to rotate by the help of a spring 12 through the medium of a lever 14 swingable about pivot P and a roller 13 pivotally mounted on lever 14 and eccentrically relative to pivot P. The viewfinder according to the present invention, which is combined with the aforesaid rangefinder, includes a reticle 35 having a plurality of border line indications 36 in the picture area, a prism system of 7, 8 and 10 to superimpose the images of the border lines on the view finder image of the external object, a positive converging lens system 9 to permit distinct viewing of the image of the indications border line, and an illuminator aperture 2.

The reticle 35 is rigidly held up by a supporting member 24 of which projecting pins 27a and 27b engage with guiding slots 28a and 28b of a bumper plate 25 rigidly secured to camera body 39 by bolts 34. Supporting member 24 rotatably supports a cam plate 20 having two cam slots, 22a and 22b, formed therein. Two identical covering masks 19a and 19b, of which the configuration is shown in FIG. 3, are superimposed in reverse relation upon each other and disposed on the reticle 35 along a diagonal of the rectangular picture indications 36. Projections 21a and 21b of the respective covering masks 19a and 19b are positioned in the corresponding cam slots 22a and 22b of cam plate 20. Both covering masks 19a and 19b are slidable on the supporting member 24 in the diagonal direction in which they are supported. A triangular plate 30 having an oblique slot 31 therein which is engaged by a pin 29 of cam plate 20, is supported by a connecting rod 32, resiliently pressed at its end by a spring 33 toward a cam 37. Cam 37 is rigidly secured to a dial 38 which is operatable externally of the camera body and bears the markings of focal lengths of objectives thereon in accordance with the setting. Guiding slots 28a and 28b of bumper plate 25 are disposed in the direction connecting the optical axis of the viewfinder and the optical axis of the photographic objectives. Pins 27a and 27b affixed to supporting member 24 of reticle 35 are guided in guiding slots 28a and 28b. It should be noted that, since pin 27a maintains contact at all times with the cam surface of cylindrical cam 18 under the urging of a spring 26, when cylindrical cam 18 is rotated around pivot P pin 16 in association with the reciprocating movement of the photographic objective during focussing, supporting member 24 moves toward the optical axis of the photographic objective whereby automatic parallax correction is obtained. It should be noted that oblique slot 31 of triangular plate 30 functions to guide the movement of cam plate 20 to introduce the other border line indications of the picture area successively and is disposed in the direction toward the optical axis of the photographic objective, thereby presenting no worried doubts about its satisfactory movement in the parallax correcting direction.

Figure 2:
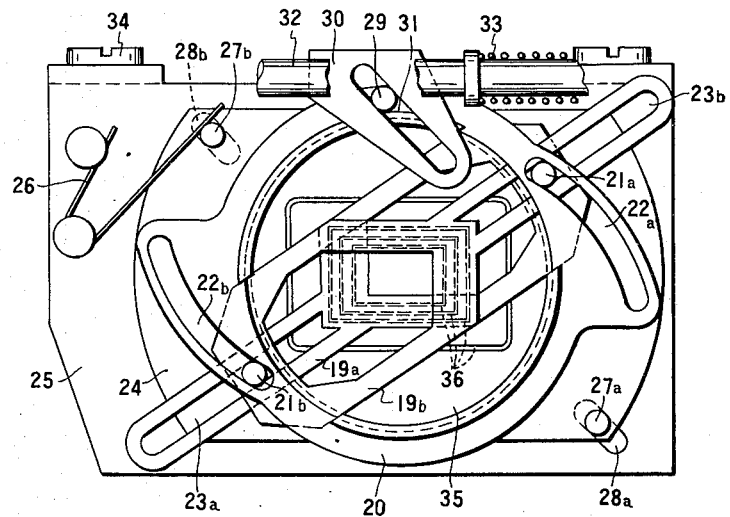
FIG. 2 is a front view of a mechanism that selects the border line of the picture area corresponding to a particular photographic objective.

Over the reticle 35 are provided a plurality of indications 36 (four are shown) to represent the range of field images corresponding to the various focal lengths of the interchangeable lenses, for example focal lengths of 5 cm., 8.5 cm., 10.5 cm., 13.5 cm., and the like, of objectives used in 35 mm. miniature cameras. As illustrated in FIG. 6 the border lines of successive picture areas may readily be produced or concealed successively by means of adequate combinations of the indications 36 and the pair of movable covering masks 19a and 19b. It should be noted that FIG. 2 illustrates the indications and mask position corresponding to the focal length of 5 cm. where the border indication shown in FIG. 6, I, only is exposed leaving all other indicators, that is, those shown in FIG. 6, II, III and IV, concealed altogether. It readily follows that the discontinuities in the individual lines of the borders in FIGURE 6 is the result of portions of one, or both, masks covering the particular indication 36.

Thus, when dial 38 is turned either to select an interchangeable objective or to correspond with the specific photographic objective, cam plate 20 rotatably mounted on supporting member 24 rotates by way of cam 37, connecting rod 32, oblique slot 31 of triangular plate 30 and pin 29, whereupon covering masks 19a and 19b slide in the diagonal direction over indications 36 of the border lines of the picture area by means of pins 21a and 21b engaging cam slots 22a and 22b of cam plate 20, with the result that indications 36 appear one by one from the exterior or disappear one by one from the interior, so that the border line of the picture area can be distinctly viewed in uniform brilliancy within the image field of the view finder. It should be noted that the innermost border lines of the picture area correspond to the focal lengths indicated on dial 38, while the border lines of the picture area produced at the outer side thereof in the image area of the viewfinder are subject to the comparative selection of the desired range of the image.

Now when the photographic objective is reciprocated for focusing, cylindrical cam 18 rotates by the urge of projection 16 rotatable around pivot P by the medium of roller 15 and lever 14, and then, supporting member 24 of the reticle 35, resiliently pressed onto the surface of cylindrical cam 18 by pin 27a, is guided toward the optical axis of the photographic objective and moves forward, with the help of guiding slots 28a and 28b of bumper plate 25, with the result that the parallax correction is performed satisfactorily.

Thus according to the present invention, the border line of the picture area can be sharply defined at uniform brilliancy with the border or frame line indication variable. Since the precision of the range in the sizes of the image area is determined by means of a reticle and not by the movement of covering masks, the structure is simple and readily adjustable. Furthermore, since the permissible allowance for the movement of the covering masks is given per se the difference in the dimension of the indicator in accordance with various focal lengths, the fabrication of the means is remarkably easy and many other indicator lines, representing the various focal lengths of interchangeable objectives, can readily be inserted. For example, in miniature 35 mm. cameras, in which the focal length of the eyepiece in practical use usually is 20 mm., the difference in the length of the diagonal of the indicator line corresponding to focal lengths of 8.5 cm. and 13.5 cm., is about 3.5 mm. It is quite easy therefore to insert one additional indicator line for a focal length of about 10.5 cm. therebetween. Another indicator line may be selectively added outside the aforesaid indicator lines. It is a particular advantage of the present invention to utilize the present means as a motif finder so that the comparative selection of the range of the image area can readily be made simultaneously by means of superimposed border lines of the picture area. Furthermore it should be noted that the border line of the picture area can alternatively be used by turning dial 38.

What I claim is:
1. A combined variable bright frame view and range finder for cameras adapted to utilize any one of a plurality of photographic objectives of different focal lengths comprising a reticle, a plurality of frame indications on the reticle defining the image areas corresponding to the focal lengths of the objectives of the plurality, a window in the camera body illuminating the reticle, a combined range and view finder in the camera, an optical means deflecting the light transmitted through the reticle into the optical path of the combined finder, a pair of like formed masks juxtaposed to the reticle in mirror relation to each other, each mask defining a like central aperture, and a manually operable camming means for moving the masks in opposite direction relative to each other along a diagonal of the frame indications so that corresponding peripheral regions of each mask simultaneously uncover the adjacent sides of the frame indication corresponding to the focal length of the objective of the plurality then in use and those of all the other objectives of the plurality of shorter focal lengths than that of the objective in use.

2. The combined finder according to claim 1 in which a base plate is supported on the camera body, the base plate defining a central aperture encircling the reticle, an annular projection encircling the central aperture on the base plate, a substantially annular second plate is rotatable on the annular projection and has a pair of diametrically opposite arcuate extensions integral therewith, an elongated circumferential slot defined in each arcuate extension, the radial distance of each slot from the center of the central aperture defined by the plates increasing in the same rotary direction from end to end of the circumferential slot, each mask of the pair defines a longitudinal elongated slot at one side of its central aperture and has a pin integral with the side opposite that defining the elongated slot, the pin of each mask passing through one of the circumferential slots as also the elongated slot of the other mask, and the manually operable camming means includes a plate cam, a rod spring pressed against the periphery of the cam, a lateral projection on an intermediate portion of the rod defining a third elongated slot at an oblique angle from the axis of the rod, and a third pin projecting from the annular second plate and extending through the third elongated slot and on manual change of the cam setting by rotation imparting relative rotary motion between the annular second plate and the base plate to move the masks to expose the frame indication for the particular focal length at which the plate cam is set and those for focal lengths less than the particular focal length.

3. The combined finder according to claim 2 in which the base plate is substantially rectangular and has a pair of integral pins diagonally opposite each other adjacent the corners of the base plate, a third fixed plate depending from the camera body and defining a pair of elongated fourth slots in the direction from the axis of the view finder aperture to the axis of the camera objective, each pin of the pair on the base plate projecting through a respective slot of the pair of fourth elongated slots, a first biasing spring tensioned between the third fixed plate and against one pin of the base plate, an angle lever pivoted on the camera body having a first arm and a second arm of which the free end of the first arm is in the path of the rearward end of the camera objective barrel, a cylindrical cam sector rotatably supported on the camera body of which one side is engaged by the free end of the second arm of the angle lever and its peripheral surface engages the other pin of the base plate, a second biasing spring acting on the cylindrical cam to bias it against the free end of the second arm of the angle lever, a second lever integral with the rotatable prism of the range finder, a third biasing spring acting on the second lever in opposition to the rotary motion of the rotatable range finder prism and the deflection of the second lever when focusing the camera objective and also acting on the second arm of the angle lever to deflect it in such direction as to tend to withdraw it from the side of the cylindrical cam an amount corresponding to the deflection of the angle lever and the second lever to permit rotation of the cylindrical cam under the tension of the second biasing spring to correct parallax when focusing the camera objective on subjects near the camera by the cam periphery correspondingly moving such other pin and the base plate in opposition to the first biasing spring.

References Cited in the file of this patent

UNITED STATES PATENTS

| 2,157,548 | Leitz | May 9, 1939 |
| 2,805,608 | Leitz et al. | Sept. 10, 1957 |
| 2,900,887 | Nerwin | Aug. 25, 1959 |

FOREIGN PATENTS

| 938,523 | Germany | Feb. 2, 1956 |
| P12251X | Germany | Aug. 9, 1956 |